Oct. 5, 1954

H. JOHNSTON 2,690,924

ELASTIC DOORKNOB

Filed Nov. 7, 1952

INVENTOR.

HOMER JOHNSTON

BY

McMorrow, Berman & Davidson

ATTORNEYS

Patented Oct. 5, 1954

2,690,924

UNITED STATES PATENT OFFICE 2,690,924

ELASTIC DOORKNOB

Homer Johnston, Rutledge, Mo.

Application November 7, 1952, Serial No. 319,204

2 Claims. (Cl. 292—347)

This invention relates to doorknobs and more particularly to an elastic or resilient doorknob which, when mounted on a door, serves as a stop to prevent damage to plaster or other structure contacted by the knob when the door is open.

It is among the objects of the invention to provide an improved resilient doorknob which has cushioning or shock absorbing characteristics when used as a door stop; which is resiliently compressible longitudinally of the associated knob shank or spindle; which includes both a resilient structure and a bumper structure of elastic material on its outer end; and which is simple and durable in construction, economical to manufacture, effective in use, and neat and attractive in appearance.

Other objects and advantages will become apparent from a consideration of the following description and the appended claims in conjunction with the accompanying drawing wherein:

Figure 1:
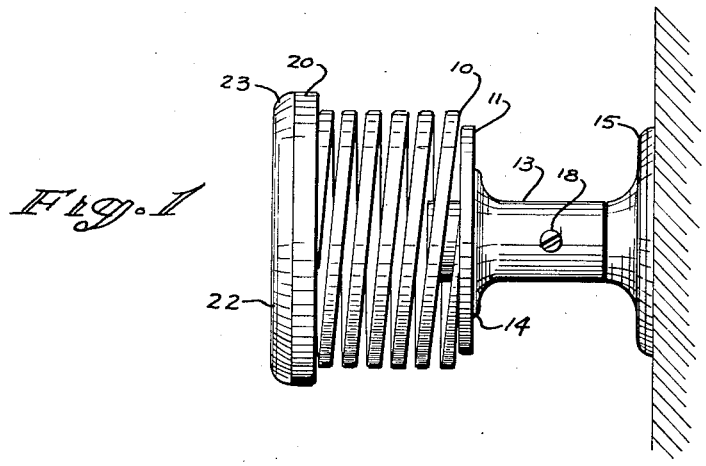
Figure 1 is a side elevational view of a resilient doorknob illustrative of the invention shown in operation position on an associated door fragmentarily illustrated.
Figure 2:
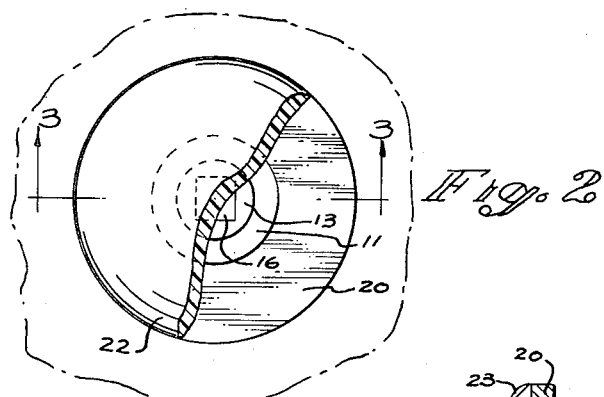
Figure 2 is an end elevational view of the doorknob with a portion broken away to better illustrate the construction thereof.
Figure 3:
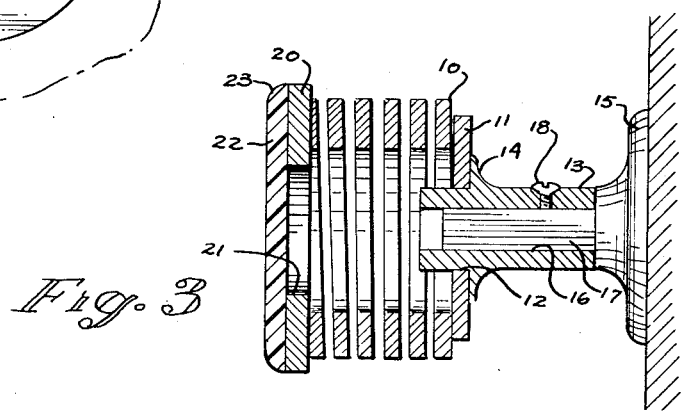
Figure 3 is a cross sectional view of the doorknob on the line 3—3 of Figure 2.

With continued reference to the drawing, the doorknob comprises a resilient body 10 having opposite, substantially parallel flat ends and constituted by a coiled compression spring of substantially cylindrical shape. In the construction illustrated, the spring 10 is formed of a coiled element of elongated, rectangular cross sectional shape, the major dimension of the cross section of which is disposed radially of the coiled spring.

A plate 11 of a diameter less than the outside diameter of the spring 10 is secured to one end of the spring substantially coaxially thereof and is provided with a central aperture 12. A sleeve 13 has one end extending through the aperture 12 in the plate 11 and is provided with an annular flange or shoulder 14 which bears against the outer side of the plate 11 to limit movement of the sleeve through the aperture 12, the sleeve being rigidly secured to the plate by suitable means, as by being welded or brazed thereto. The sleeve extends from the flange 14 in a direction away from the plate and is adapted to contact, at its end remote from the plate 11, the central boss of an escutcheon plate 15 of an associated lock. The sleeve 13 is provided with a coaxial bore 16 of polygonal shape which receives the corresponding end portion of the associated lock spindle or shank 17 and the sleeve is secured on the shank or spindle 17 by suitable means, such as the set screw 18 threaded through a tapped hole in the sleeve and bearing at its inner end against the surface of the spindle. The plate 11 and sleeve 13 together constitute a spindle receiving socket mounted on the corresponding end of the resilient body 10.

A flat, circular plate 20 of a diameter somewhat greater than the outside diameter of the spring 10 is secured on the end of the spring remote from the plate 11 coaxially of the spring, and is provided with a central aperture 21 of a diameter somewhat less than the internal diameter of the spring 10 and a flat bumper element 22 of circular shape and of substantially the same diameter as the plate 20 is secured on the outer side of the plate with its edge flush with the edge of the plate. The bumper element 22 is formed of an elastic material, such as rubber, and has a rounded off peripheral edge, as indicated at 23. It also has sufficient thickness to provide a cushioning effect when it is impacted against a structure, such as a plaster wall or an adjacent door.

The spring 10 is resiliently compressible in a direction longitudinally of the associated knob or lock spindle 17 to provide a shock absorbing effect, and this, together with the cushioning effect of the bumper element 22, provides a shock absorbing, resilient knob which serves effectively as a door stop and eliminates the necessity of providing the usual stop on the baseboard to stop the door before the doorknob impacts an adjacent structure.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A doorknob comprising a resilient body having opposite ends, a spindle receiving socket on one end of said body, and a bumper structure on the other end of said body and spaced from said socket, said resilient body comprising a coiled compression spring and said bumper structure comprising a flat plate secured on one end of said spring and a flat element of elastic material secured on the outer side of said plate.

2. A doorknob comprising a resilient body having opposite ends, a spindle receiving socket on one end of said body, and a bumper structure on the other end of said body and spaced from said socket, said resilient body comprising a coiled spring and said spindle receiving socket comprising a centrally apertured plate secured on one end of said spring substantially coaxially of the spring, and a sleeve having one end secured in the aperture in said plate and projecting from the outer side of the plate, said sleeve having a bore of polygonal cross section extending therethrough for receiving an associated lock spindle.

References Cited in the file of this patent

UNITED STATES PATENTS

| Number | Name | Date |
|---|---|---|
| 58,279 | Mueller | Sept. 25, 1866 |
| 578,021 | Morse | Mar. 2, 1897 |
| 1,232,000 | Chase | July 3, 1917 |
| 2,079,346 | Golden | May 4, 1937 |
| 2,131,067 | Paden | Sept. 27, 1938 |
| 2,462,174 | Fisher | Feb. 22, 1949 |
| 2,479,597 | Anton | Aug. 23, 1949 |